J. A. AUBRY.
GAGING ATTACHMENT FOR ICE CREAM MOLDS.
APPLICATION FILED JULY 17, 1908.

938,628.

Patented Nov. 2, 1909.

Witnesses:
Darwin Seymour
William C. Smith

Inventor:
Joseph A. Aubry.
By Joshua R. H. Potts
Atty.

UNITED STATES PATENT OFFICE.

JOSEPH A. AUBRY, OF HAMMOND, INDIANA.

GAGING ATTACHMENT FOR ICE-CREAM MOLDS.

938,628.

Specification of Letters Patent. Patented Nov. 2, 1909.

Application filed July 17, 1908. Serial No. 443,976.

*To all whom it may concern:*

Be it known that I, JOSEPH A. AUBRY, a citizen of the United States, residing at Hammond, county of Lake, and State of Indiana, have invented certain new and useful Improvements in Gaging Attachments for Ice-Cream Molds, of which the following is a specification.

My invention relates to ice-cream molds, and more especially to gaging devices for the same.

The object of my invention is to provide a device of the character mentioned, which may be manufactured simultaneously with the ordinary ice-cream mold, or may be made to form a readily attachable attachment for those already in use, for the purpose of uniformly gaging the quantity of ice-cream that is each time dished up.

A further object of my invention is to provide a device of the character mentioned, which will be strong, durable and simple of construction, hence of low cost to manufacture.

Other objects will appear hereinafter.

With these objects in view, my invention consists generally in a knife-edged metal blade which may be so arranged or pivotally mounted upon the handle portion of an ice-cream mold so as to be adapted to rest upon the mouth-edge of the mold proper of the same and so as to be adapted to be rotated over or upon said edge.

My invention further consists in manually operable means for actuating said blade, and in means for returning said blade to initial position after each operation of the same.

My invention further consists in certain details of construction and arrangements of parts all as will be hereinafter fully described and particularly pointed out in the claims.

My invention will be more readily understood by reference to the accompanying drawings forming a part of this specification, and in which—

Figure 1:
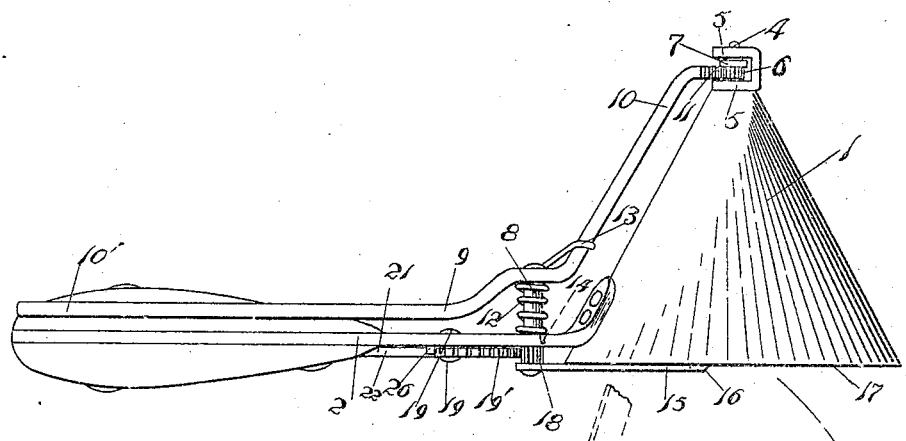
Figure 2:
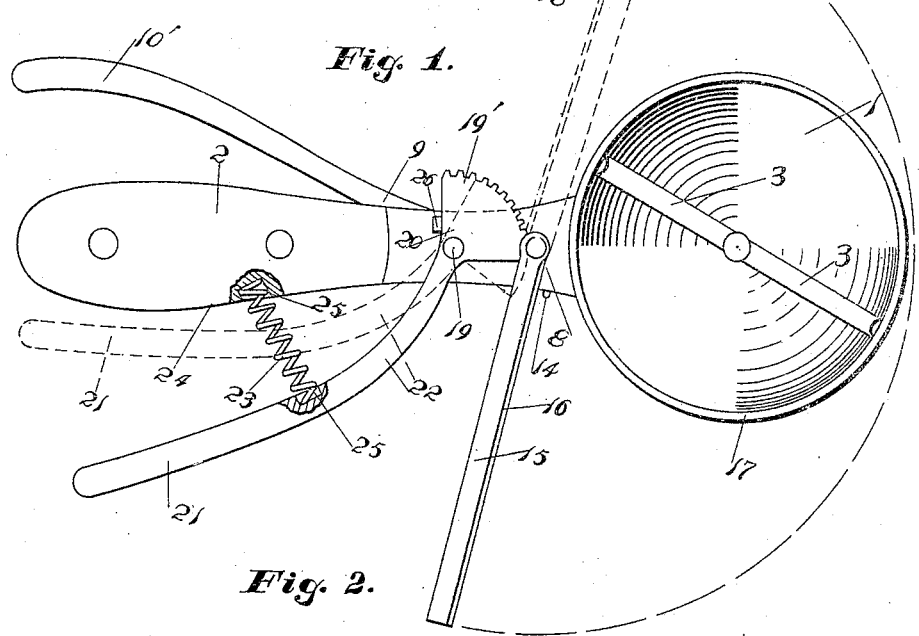

Figure 1 is a side elevation of an ordinary ice-cream mold, the same being provided with the preferred form of my device, and Fig. 2 is a bottom plan view thereof.

Referring now to the drawings, 1 indicates the ordinary conical-shaped metal ice-cream mold proper, the same being provided with a suitable handle portion 2.

3 indicates the ordinary ice-cream severing blades which are adapted to rest against and to be rotated upon the inner surface of said mold member 1. Formed integrally with said blades and projecting from the apex thereof, is a shaft 4, bearings for the same being provided in a bracket member 5 formed integrally with said mold member and upon the apex thereof. Said shaft is provided with the gear teeth 6 and an integral outwardly extending flanged portion 7. Pivotally mounted upon a stud shaft 8 the latter being fixed in the handle portion 2, is a lever 9. The extremity 10 of said lever 9 is provided with the usual integral segmental gear 11, the teeth of which mesh with the gear teeth 6 of the shaft 4, the opposite end portion being provided with a handle 10′. The flange 7 of the shaft 4 is adapted to rest upon the upper surface of said segmental gear 11, hence, acts as a means of locking said shaft and severing blades in position. It is obvious that by drawing the handle portion 10 of said lever 9 toward the handle 2 of the mold, the severing blades 3 may be operated, that is, revolved.

12 indicates the ordinary coil spring, the end 13 of which rests against the lever 9 and the end portion 14 of the same being suitably fixed to the handle portion 2, said spring being adapted to return the lever 9 to its initial position after each operation of said lever.

Thus far I have described the construction and operation of an ordinary ice-cream mold, the same however, is not a part of my invention, as my device may obviously be attached to any suitable form of ice-cream mold. Rotatably mounted upon the lower end portion of the stud shaft 8 or upon a separate shaft provided for that purpose, is a blade 15. The same is provided with a knife-edge 16 and is adapted to rest upon the mouth edge 17 of the mold proper 1. Said blade 15 is of such a length as to extend beyond that portion of the edge 17 of the mold proper 1 which is farthest from the pivotal point of said blade for obvious reasons. Formed integrally with said blade and projecting vertically therefrom, the shaft 8 acting as a bearing for the same, is a gear wheel 18. Pivotally mounted upon the undersurface of the handle 2 as at 19 and provided at its outer end portion 20 with a segmental gear 19′ which is adapted to mesh with the gear wheel 18, and at its inner end portion with a handle 21 formed integrally therewith, is a lever 22. It is obvious with this arrangement that if the handle portion 21 of the lever 22 is drawn toward the handle portion 2 of the mold, the blade 15 will be forced or rotated over the edge 17 of the mold proper 1. So as to facilitate returning the blade to its initial position after each operation of the same, a coil spring 23 is interposed between the inside surface of the handle portion 21 of the lever 22 and the surface 24 of the handle 2, said parts being drilled or slotted as at 25 to form seats for either of the ends of said spring, said spring obviously forcing said handle portions apart. A lug 26 projecting from the undersurface of the handle 2 acts as a stop for the segmental gear 19' and is provided for obvious reasons.

When in normal position, the blade 15 extends back from the mold proper of the mold as shown in Fig. 2 of the drawings, and is so positioned as not to interfere while filling said mold with ice-cream. When the mold is filled the blade is forced across the mouth-edge 17 of the same by drawing the handle 21 of the lever 22 toward the handle 2 of the mold as before stated. By so doing, any ice-cream projecting beyond said edge 17 of the mouth of the mold, is cut away and may be dropped back into the ice-cream freezer or other receptacle. The handle 10' of the lever is then drawn toward the handle 2 of the mold, thus operating the severing blades 3 which sever the ice-cream from the sides of the mold proper allowing the same to be deposited in a dish or other receptacle provided for the reception of the ice-cream. When the handles of said levers have been released they will be returned to normal position and the mold is ready for another filling.

It is obvious that with the provision of a blade and operating lever, as just described, in an ice-cream mold, it will facilitate figuring beforehand as to the exact number of dishes of ice-cream that may be obtained from a known quantity of ice-cream, as the capacity of the mold by such provision is constant. This necessarily results in a great convenience to caterers or others it being impossible for the latter at the present time because of their using the ordinary ice-cream mold, to estimate with any degree of exactness as to the number of dishes that may be had from a known quantity of ice-cream, as in the latter case, the quantity of ice-cream dished up each time necessarily varies.

Having described my invention what I claim as new, and desire to secure by Letters Patents, is:

1. The combination with a mold consisting of a mold proper and of a handle portion secured thereto, of a blade pivotally mounted upon a stud-shaft secured to said handle portion, said blade being adapted to rest and to be rotated upon the mouth-edge of said mold proper, a gear wheel secured to or formed integrally with the pivotal end portion of said blade, and means in mesh with said gear wheel adapted to be manually operated for actuating said blade, substantially as described.

2. The combination with a mold consisting of a mold proper and of a handle portion secured thereto, of a blade pivotally mounted upon said handle portion, said blade being adapted to rest and to be rotated upon the mouth-edge of said mold, a lever pivotally mounted upon said handle portion, said lever being adapted when manually operated to actuate said blade, and means for automatically returning said lever and said blade to initial position after each operation of the same, substantially as described.

3. In a device of the class described, a mold and a handle secured thereto in combination with a blade pivotally mounted and adapted to be rotated across the mouth edge of said mold, a lever for operating said blade, and a spring interposed between said handle and said lever for returning the blade to normal position, substantially as described.

In testimony whereof I have signed my name to this specification in the presence of two subscribing witnesses.

JOSEPH A. AUBRY.

Witnesses:
JANET E. HOGAN,
HELEN F. LILLIS.